United States Patent
Yoon et al.

(10) Patent No.: US 11,530,315 B2
(45) Date of Patent: *Dec. 20, 2022

(54) HIGHLY FLAME-RETARDANT ORGANICALLY MODIFIED NANOPARTICLE, ORGANIC-INORGANIC COMPOSITE SYNTHETIC RESIN CONTAINING THE SAME AND PROCESSED PRODUCT THEREOF

(71) Applicant: KYUNG DONG ONE CORPORATION, Seoul (KR)

(72) Inventors: Jong Hyun Yoon, Seoul (KR); Sang Yun Lee, Seoul (KR); Dae Woo Nam, Seoul (KR); Dong Eui Kim, Seoul (KR)

(73) Assignee: KYUNG DONG ONE CORPORATION, Seoul (KR)

( * ) Notice: Subject to any disclaimer, the term of this patent is extended or adjusted under 35 U.S.C. 154(b) by 190 days.

This patent is subject to a terminal disclaimer.

(21) Appl. No.: 17/167,818

(22) Filed: Feb. 4, 2021

(65) Prior Publication Data

US 2021/0171737 A1 Jun. 10, 2021

Related U.S. Application Data

(63) Continuation-in-part of application No. PCT/KR2020/013813, filed on Oct. 8, 2020.

(30) Foreign Application Priority Data

Oct. 10, 2019 (KR) .................. 10-2019-0125703

(51) Int. Cl.
*C08K 9/04* (2006.01)
*C08K 3/04* (2006.01)
(Continued)

(52) U.S. Cl.
CPC .............. *C08K 9/04* (2013.01); *C08J 3/215* (2013.01); *C08J 5/18* (2013.01); *C08K 3/041* (2017.05);
(Continued)

(58) Field of Classification Search
CPC ...... C08K 3/34; C08K 3/346; C08K 5/34924; C08K 5/5313; C08K 9/04; C09C 1/42; C01B 33/44
See application file for complete search history.

(56) References Cited

U.S. PATENT DOCUMENTS 6,355,717 B1 * 3/2002 Tamura .................... C08K 9/04
524/448
6,547,992 B1 * 4/2003 Schlosser ........... C08K 5/34928
524/133
(Continued)

FOREIGN PATENT DOCUMENTS

CN 106957454 A * 7/2017 .............. C08K 3/22
CN 110951113 A * 4/2020
(Continued)

OTHER PUBLICATIONS

Machine translation of CN 110951113 (2020, 9 pages).*
(Continued)

*Primary Examiner* — Brieann R Johnston
(74) *Attorney, Agent, or Firm* — Novick, Kim & Lee PLLC; Jae Youn Kim

(57) ABSTRACT

Proposed are an organic-inorganic composite synthetic resin using a highly flame-retardant organically modified nanoparticle, and a production method thereof. The method for producing the organic-inorganic composite synthetic resin using a highly flame-retardant organically modified nanoparticle includes the steps of: adding and stirring metal ion-based phosphinate, melamine cyanurate, and nanoclay
(Continued)

to a container containing an aqueous or oily solvent, applying ultrasonic waves and high pressure energy to the stirred solution to prepare a highly flame-retardant organically modified silicate solution through a chemical bonding, and then adding a synthetic resin to form synthetic leather and foam used as life consumer goods to the silicate solution, processing and drying it.

13 Claims, 14 Drawing Sheets

(51) Int. Cl.
  *C09D 7/40*     (2018.01)
  *C09D 7/62*     (2018.01)
  *C08J 5/18*     (2006.01)
  *C08K 3/34*     (2006.01)
  *C08K 13/06*     (2006.01)
  *C09C 1/42*     (2006.01)
  *C09D 5/18*     (2006.01)
  *C09D 175/06*    (2006.01)
  *C08J 3/215*     (2006.01)
  *C08K 5/3492*    (2006.01)
  *C08K 5/5313*    (2006.01)

(52) U.S. Cl.
  CPC .......... *C08K 3/346* (2013.01); *C08K 5/34924* (2013.01); *C08K 13/06* (2013.01); *C09C 1/42* (2013.01); *C09D 5/18* (2013.01); *C09D 7/62* (2018.01); *C09D 7/67* (2018.01); *C09D 7/69* (2018.01); *C09D 7/70* (2018.01); *C09D 175/06* (2013.01); *C01P 2002/72* (2013.01); *C01P 2002/82* (2013.01); *C01P 2004/61* (2013.01); *C01P 2004/64* (2013.01); *C01P 2006/10* (2013.01); *C08J 2375/06* (2013.01); *C08K 5/5313* (2013.01); *C08K 2201/005* (2013.01); *C08K 2201/011* (2013.01); *C08K 2201/014* (2013.01)

(56) References Cited

U.S. PATENT DOCUMENTS

| | | | | |
|---|---|---|---|---|
| 7,803,856 | B2* | 9/2010 | Perego ................ | C08K 5/5313 |
| | | | | 524/133 |
| 2004/0225040 | A1* | 11/2004 | Hoerold ............... | C08K 5/5313 |
| | | | | 252/609 |
| 2007/0194289 | A1* | 8/2007 | Anglin .................... | C01B 33/44 |
| | | | | 252/378 R |
| 2009/0317627 | A1* | 12/2009 | Tsai ........................ | C01B 33/44 |
| | | | | 977/735 |
| 2016/0319100 | A1* | 11/2016 | Arechederra ............ | C08K 9/04 |

FOREIGN PATENT DOCUMENTS

| | | | | |
|---|---|---|---|---|
| CN | 112812366 | A  * | 5/2021 | .............. C08J 5/043 |
| EP | 3885401 | A1 * | 9/2021 | |
| JP | 2007-297489 | A | 11/2007 | |
| JP | 2010-006695 | A | 1/2010 | |
| KR | 10-2005-0088042 | A | 9/2005 | |
| KR | 10-2008-0077521 | A | 8/2008 | |

OTHER PUBLICATIONS

Machine translation of CN 112812366 (2021, 9 pages).*
Machine translation of CN 106957454 (2017, 11 pages).*
Lorenzetti et al., "Phosphinates and layered silicates in charring polymers: The flame retardancy action in polyurethane foams", Polymer Degradation and Stability, 2013, pp. 2366-2374.

* cited by examiner

Photograph of flame retardant test result of Comparative Examples

| Category | Comparative Example1 | Comparative Example2 | Comparative Example3 | Comparative Example4 | Comparative Example5 |
|---|---|---|---|---|---|
| Before burning | | | | | |
| After burning | | | | | |

FIG. 10

Photograph of flame retardant test result of Comparative Examples

| Category | Comparative Example26 | Comparative Example27 | Comparative Example28 | Comparative Example29 | Comparative Example30 |
|---|---|---|---|---|---|
| Before burning | | | | | |
| After burning | | | | | |

FIG. 15

HIGHLY FLAME-RETARDANT ORGANICALLY MODIFIED NANOPARTICLE, ORGANIC-INORGANIC COMPOSITE SYNTHETIC RESIN CONTAINING THE SAME AND PROCESSED PRODUCT THEREOF

CROSS-REFERENCE TO RELATED APPLICATIONS

This application is a continuation-in-part of PCT/KR2020/013813, filed Oct. 8, 2020, which claims priority to KR 10-2019-0125703, filed Oct. 10, 2019, the entire disclosure of which is incorporated herein by reference.

TECHNICAL FIELD

The present invention relates to a highly flame-retardant organically modified nanoparticle, an organic-inorganic composite synthetic resin containing the same and a processed product thereof. In order to provide a synthetic leather and foam for consumer goods such as automobiles, furniture, clothes, shoes, and electronic products having high flame retardancy, it relates to a technology including: applying ultrasonic waves or high pressure to a solution containing metal ion-based phosphinate, melamine cyanurate and nanoclay to prepare a highly flame-retardant organically modified silicate solution through a chemical bond, and adding a synthetic resin to form a synthetic leather and a foam to the silicate solution, processing and drying it.

BACKGROUND ART

Synthetic resins including synthetic leathers and foams, which are used in various ways as life consumer goods, are increasingly used every year. However, since the synthetic resins are composed of organic materials, they are vulnerable to heat and are easily burned, so that their use in places vulnerable to fire or in fields where high heat is generated is extremely restricted.

In order to solve such problems, research to improve the flame retardancy of synthetic resins has been conducted for a long time. In particular, the flame retardant effect has been improved by a method of mixing a halogen-based flame retardant such as bromine and chlorine, a phosphorus-based flame retardant, a nitrogen-based flame retardant, an inorganic flame retardant or the like with the synthetic resin.

Among them, the addition of halogen-based flame retardants, which are known to be the most effective, discharges toxic substances to the human body such as dioxins and hydrogen halides generated during burning, and thus, their use is expected to be gradually restricted. Phosphorus-based or nitrogen-based flame retardants have relatively little flame-retardant effect compared to the cost or the amount used, and do not show physical property advantages due to the decrease in water resistance.

The inorganic flame retardants have a high specific gravity and have a high sense of difference with organic materials, so that the phase separation such as the precipitations are easily occurred.

Some inorganic flame retardants or inorganic expansion agents having a light specific gravity have the effect of blocking the flame during burning, but if the flame is continuously applied, it melts and collapses together with the synthetic resin and thus, the flame retardant performance decreases again.

Therefore, the addition of such flame retardant alone is insufficient to satisfy the flame retardant performance of the synthetic resins currently required.

Recently, in order to solve the conventional problems, a method has been proposed in which various nanoparticles having a large surface area are uniformly dispersed in a synthetic resin to improve physical properties along with excellent flame retardancy.

In particular, the flame retardant properties through nanoclay are exhibited by a mechanism in which nanoclay particles with a large aspect ratio through the insertion of the synthetic resins into the nanoclay and exfoliation between nanoclay layers increase the contact area with these synthetic resins, thereby blocking heat and effectively preventing diffusion in a fire situation.

The nanoclay forms a 1:1 or 1:2 layered structure by the plate-like bonds from the basic structure of a silica tetrahedron and alumina octahedron composed of components such as silicon, aluminum, magnesium, and oxygen. Each layer has a structure with a thickness of 1 to 10 nm, a length of 30 to 1,000 nm, and an interlayer spacing of several Å (angstrom, 1 Å=10 nm).

Dispersion methods for inserting and exfoliating the resin between the layers of the nanoclay include a solution dispersion method, a melting method, and an ultrasonic method. The solution dispersion method is a method of inducing interlayer insertion of the resin through stirring when the nanoclay swells and expands between layers in a liquid phase. The problem at this time is that since the nanoclay is aggregated by the Van der Waals attraction acting between layers, not only the insertion efficiency is very low, but also the exfoliation is still more difficult. The melting method has a limitation that a thermoplastic resin capable of melting within 200° C. must be used, but the thermosetting foam has difficulties in application. The ultrasonic method is a method of expanding between the layers of nanoclay at the maximum by applying ultrasonic waves above a certain level, and inserting and exfoliating the resin therebetween. The efficiency of interlayer insertion or exfoliation of nanoclays varies depending on the degree of ultrasonic intensity, the control thereof is absolutely necessary.

The prior art using nanoclays used a solution dispersion method to insert the resin between nanoclay layers. As mentioned above, because the nanoclay is aggregated by the Van der Waals attraction between layers, the insertion efficiency of the resin is low, exfoliating is more difficult, and thus the effect is not sufficient.

However, if the techniques of effectively dispersing, inserting, and exfoliating nanoclays in these materials are not fully accomplished, nanoclays are made to be nothing more than simple inorganic flame retardants, and only the adverse effects of deteriorating mechanical and physical performance, rather than improving flame retardancy can occur.

Researchers at some overseas companies and institutions have tried to derive results of dispersing nanoclays and improving flame retardant performance based on synthetic resins, but the effect is significantly low relative to the added process cost, so it did not lead to mass production, and the situation was often ended with only research.

PRIOR PATENT LITERATURE (Patent Literature 1) U.S. Pat. No. 7,803,856.
(Patent Literature 2) Korean Registered Patent Publication No. 0882307.

(Patent Literature 3) Korean Registered Patent Publication No. 0847044.
(Patent Literature 4) Korean Registered Patent Publication No. 0579842.

DETAILED DESCRIPTION OF THE INVENTION

Technical Problem

It is an object of the present invention to provide an organic-inorganic composite synthetic resin using a highly flame-retardant organically modified silicate produced by a process including the steps of: adding and stirring metal ion-based phosphinate, melamine cyanurate, and nanoclay to a container containing an aqueous or oily solvent, applying ultrasonic waves and high pressure energy to the stirred solution to prepare a highly flame-retardant organically modified silicate solution through a chemical bonding, and then adding a synthetic resin to form a synthetic leather and foam used as life consumer goods to the silicate solution, processing and drying it, and a processed product thereof, and an organic modified nanoparticle contained in the organic-inorganic composite synthetic resin.

Technical Solution

A method for producing an organic-inorganic composite synthetic resin according to the present invention includes the steps of: (1) mixing nanoclay, metal ion-based phosphinate, and melamine cyanurate in an aqueous solvent or an oily solvent to prepare a first mixed solution; (2) subjecting the first mixed solution to an ultrasonic treatment or a high pressure treatment to prepare a second mixed solution; and (3) adding a synthetic resin solution to the second mixed solution.

The nanoclay may have a water content of 0.5% to 10%, a true density of 1.5 $g/cm^3$ to 3 $g/cm^3$, and an average particle size (D50) of 30 μm or less.

The nanoclay may include at least one selected from the group consisting of montmorillonite, bentonite, hectorite, saponite, bidelite, nontronite, mica, vermiculite, carnemite, magadiite, kenyaite, kaolinite, smectite, illite, chlorite, muscovite, pyrophillite, antigorite, sepiolite, imogolite, sobokite, nacrite, anoxite, sericite, redikite and combinations thereof.

The nanoclay may consist in a combination with carbon nanotubes.

The metal ion-based phosphinate is a metal ion charged with positive (+) charge which includes at least one selected from the group consisting of aluminum ion ($Al^{3+}$), zinc ion ($Zn^{2+}$), calcium ion ($Ca^{2+}$), magnesium ion ($Mg^{2+}$), copper ion ($Cu^{2+}$), and iron ion ($Fe^{2+}$, $Fe^{3+}$), and a phosphinate group charged with negative (−) charge which includes at least one selected from the group consisting of hypophosphinate, monoalkylphosphinate, monoallyl phosphinate, dialkyl phosphinate, diallylphosphinate and alkylallylphosphinate.

A cyanurate group of the melamine cyanurate may coexist in a keto form and an enol form.

In step (1), the nanoclay may be mixed in an amount of 1 to 15 parts by weight, the metal ion-based phosphinate is mixed in an amount of 1 to 30 parts by weight, and the melamine cyanurate is mixed in an amount of 1 to 20 parts by weight.

In step (2), the ultrasonic treatment may be performed with a frequency of 20 kHZ and an output of 200 W to 3,000 W.

In step (2), the high pressure treatment may be performed by applying a pressure of 1,000 bar to 3,000 bar.

In step (2), the ultrasonic treatment or the high pressure treatment may be performed at a temperature equal to or lower than the boiling point of the aqueous solvent or the oily solvent.

In step (2), the ultrasonic treatment or the high pressure treatment may include swelling the nanoclay contained in the first mixed solution and separating the interlayer distance of the nanoclay to form a plurality of nano-interlayer exfoliation layers.

In step (2), the method may include inserting the metal ion-based phosphinate and the melamine cyanurate between the plurality of nano-interlayer exfoliation layers.

The insertion in step (2) may be performed in which a hydroxyl group on the surface of the nano-interlayer release layer is chemically bonded to the cyanurate group of the melamine cyanurate, and a melamine group of the melamine cyanurate is chemically bonded to the phosphinate group of the metal ion-based phosphinate.

The hydroxyl group on the surface of the nano-interlayer exfoliation layer may form a hydrogen bond with a keto-type carbonyl group of the cyanurate group of the melamine cyanurate, or the hydroxyl group on the surface of the nano-interlayer exfoliation layer may form a condensation bond with an enol-type hydroxyl group of the cyanurate group of the melamine cyanurate.

A nitrogen atom charged with a positive (+) charge contained in the melamine group of the melamine cyanurate may form an ionic bond with a phosphinate group charged with negative (−) charge contained in the metal ion-based phosphinate.

In step (3), the synthetic resin may include at least one thermoplastic or thermosetting synthetic resin selected from the group consisting of polyurethane, polyurea, polyethylene terephthalate, polyvinyl chloride, polysilicon and polyethylene.

The synthetic resin may have a viscosity of 20,000 to 200,000 cps.

In step (3), the second mixed solution and the synthetic resin solution may be mixed in a weight ratio of 1:0.5 to 1:3.

According to the present invention, an organic-inorganic composite synthetic resin processed product can be prepared by including the step of processing the organic-inorganic composite synthetic resin by at least one process of molding, coating, and film formation.

The flame-retardant organically modified nanoparticle according to the present invention includes one or more nano-interlayer exfoliation layers exfoliated from nanoclay, metal ion-based phosphinate, and melamine cyanurate, wherein a hydroxyl group on the surface of the nano-interlayer exfoliation layer is chemically bonded to a cyanurate group of the melamine cyanurate, and a melamine group of the melamine cyanurate is chemically bonded to a phosphinate group of the metal ion-based phosphinate, The nanoclay may include at least one selected from the group consisting of montmorillonite, bentonite, hectorite, saponite, bidelite, nontronite, mica, vermiculite, carnemite, magadiite, kenyaite, kaolinite, smectite, illite, chlorite, muscovite, pyrophillite, antigorite, sepiolite, imogolite, sobokite, nacrite, anoxite, sericite, redikite and combinations thereof.

The nanoclay may consist in a combination with carbon nanotubes.

The metal ion-based phosphinate may include, as a metal ion charged with positive (+) charge, at least one selected from the group consisting of aluminum ion ($Al^{3+}$), zinc ion ($Zn^{2+}$), calcium ion ($Ca^{2+}$), magnesium ion ($Mg^{2+}$), copper ion ($Cu^{2+}$), and iron ion ($Fe^{2+}$, $Fe^{3+}$), and include, as a phosphinate group charged with negative (−) charge, at least one selected from the group consisting of hypophosphinate, monoalkylphosphinate, monoallyl phosphinate, dialkyl phosphinate, diallylphosphinate and alkylallylphosphinate.

A cyanurate group of the melamine cyanurate may coexist in a keto form and an enol form.

The hydroxyl group on the surface of the nano-interlayer exfoliation layer may form a hydrogen bond with a keto-type carbonyl group of the cyanurate group of the melamine cyanurate, or the hydroxyl group on the surface of the nano-interlayer exfoliation layer may form a condensation bond with an enol-type hydroxyl group of the cyanurate group of the melamine cyanurate.

A nitrogen atom charged with a positive (+) charge contained in the melamine group of the melamine cyanurate may forms an ionic bond with a phosphinate group charged with negative (−) charge contained in the metal ion-based phosphinate.

The organic-inorganic composite synthetic resin according to the present invention includes the highly flame-retardant organic modified nanoparticles, and a synthetic resin.

The synthetic resin may include at least one thermoplastic or thermosetting synthetic resin selected from the group consisting of polyurethane, polyurea, polyethylene terephthalate, polyvinyl chloride, polysilicon and polyethylene.

The synthetic resin may have a viscosity of 20,000 to 200,000 cps.

An organic-inorganic composite synthetic resin processed product according to the present invention is obtained by processing the organic-inorganic composite synthetic resin by at least one process of molding, coating, and film formation.

The processed product may achieve a V-0 rating by the UL-94V (Vertical Burning Test) method.

Advantageous Effects

According to the embodiment of the present invention, the organic-inorganic composite synthetic resin using the highly flame-retardant organically-modified silicate prepared according to the present invention achieves a V-0 rating by UL-94V (Vertical Burning Test) method, thereby exhibiting an excellent flame retardant effect.

BRIEF DESCRIPTION OF THE DRAWINGS

FIGS. 10 to 16 are photographs of the burning patterns of the synthetic leathers of Comparative Examples 1 to 33 during the burning test according to the UL-94V test.

DETAILED DESCRIPTION OF THE EMBODIMENTS

Hereinafter, the method for producing an organic-inorganic composite synthetic resin using the highly flame-retardant organically modified silicate of the present invention will be described in more detail with reference to the accompanying figures.

The method for producing an organic-inorganic composite synthetic resin using the highly flame-retardant organically modified silicate of the present invention includes a step of preparing a first mixed solution, a step of preparing a second mixed solution, and a step of adding a synthetic resin solution. Specifically, the method for producing the organic-inorganic composite synthetic resin of the present invention includes (1) a step of adding a metal ion-based phosphinate, melamine cyanurate, and nanoclay to an aqueous or oily solvent; (2) a step of swelling the nanoclay under the aqueous or oily solvent, and stirring the swollen nanoclay, the metal ion-based phosphinate, and the melamine cyanurate to prepare a first mixed solution; (3) a step of subjecting the first mixed solution to an ultrasonic treatment process or a high pressure treatment process to separate between the layers of the swollen nanoclay; (4) a step in which the metal ion-based phosphinate and the melamine cyanurate inserted between the layers of nanoclay separated between the layers, thereby exfoliating between the layers of the nanoclay; (5) a step of chemically bonding the melamine cyanurate and the nanoclay through the ultrasonic treatment process or the high pressure treatment process; (6) a step of chemically bonding the melamine cyanurate and the metal ion-based phosphinate through the ultrasonic treatment process or the high pressure treatment process; (7) a step in which the nanoclay is chemically bonded to and surrounded by the metal ion-based phosphinate and the melamine cyanurate, thereby preparing a second mixed solution remaining in a form that maintains complete exfoliation between the layers of the nanoclay; and (8) a step of adding a synthetic resin solution to the second mixed solution.

Referring to FIGS. 1A-1D, the method or the mechanism for preparing the organic-inorganic composite synthetic resin according to the present invention will be described in more detail.

FIGS. 1A-1D are schematic diagrams showing a method for producing an organic-inorganic composite synthetic resin using a highly flame-retardant organic modified silicate according to the embodiment of the present invention.

Figure 1A:
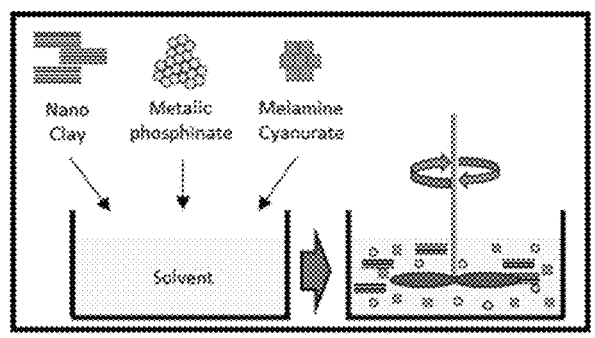
FIGS. 1A-1D are schematic diagrams showing a method for producing an organic-inorganic composite synthetic resin using a highly flame-retardant organic modified silicate according to the embodiment of the present invention.

Referring to FIGS. 1A-1D, in step (1), a metal ion-based phosphinate, melamine cyanurate, and nanoclay are added in a certain amount to a container containing an aqueous or oily solvent, and mixed. (FIG. 1A)

The aqueous or oily solvent may be at least one selected from the group consisting of aqueous solvents of alcohols such as water, ethanol, methanol, isopropyl alcohol, and n-hexanol, and oily solvents, such as aromatic hydrocarbons such as toluene and xylene, ketones such as acetone, methyl ethyl ketone, and methyl isobutyl ketone, ethers such as tetrahydrofuran, acetate esters such as ethyl acetate and butyl acetate, amides such as dimethylformamide and N-methylpyrrolidone, 1,2-dichlorobenzene, N-methylpyrrolidone(NMP), N,N-dimethylformamide(DMF), cyclohexanone, propylene glycol monoketyl ether acetate, dimethylacetamide (DMAc), dimethyl sulfoxide, ethyl acetate, and butyl acetate, without being limited thereto.

The metal ion-based phosphinate includes a phosphinate group having a negative (−) charge and a metal ion having a positive (+) charge.

In accordance with the embodiment, the phosphinate group having a negative (−) charge may be at least any one of hypophosphinate, monoalkyl or monoallylphosphinate, dialkyl or diallyl or alkylallylphosphinate, depending on the number and structure of the alkyl group in the substituent.

In accordance with the embodiment, the metal ion having the positive (+) charge may be at least one of aluminum ($Al^{3+}$), zinc ($Zn^{2+}$), calcium ($Ca^{2+}$), magnesium ($Mg^{2+}$), copper ($Cu^{2+}$), and iron ($Fe^{2+}$, $Fe^{3+}$).

The solid content of the metal ion-based phosphinate, the melamine cyanurate and the nanoclay may be included in an amount of 50 parts by weight in the first mixed solution. When the content exceeds 50 parts by weight, the dispersibility of the solid content of the metal ion-based phosphinate, the melamine cyanurate, and the nanoclay is low, and the efficiency of chemical bonding between them is lowered.

Further, the first mixed solution may contains 1 part by weight to 30 parts by weight of the metal ion-based phosphinate, 1 part to 20 parts by weight of the melamine cyanurate, and 1 part to 15 parts by weight of the nanoclay.

When the content of the metal ion-based phosphinate is less than 1 part by weight or exceeds 30 parts by weight, the flame retardancy is lowered. Similarly, when the content of the melamine cyanurate is less than 1 part by weight or exceeds 20 parts by weight, the flame retardancy is lowered.

The metal ion-based phosphinate generates polyphosphoric acid during burning and promote a dehydration reaction to form char, thereby increasing the flame retardant performance of the synthetic resin compound in step (8) described later.

The melamine cyanurate is a nitrogen gas generated during burning and prevents oxidation of the synthetic resin compound in step (8) described later.

Therefore, in order to maximize the flame retardant performance, it is necessary to use the synergy of the metal ion-based phosphinate and the melamine cyanurate. However, if the content is deviated from each of the set amounts, the adverse effect of lowering the flame retardancy occurs.

If the content of the nanoclay is less than 1 part by weight, the flame retardancy is lowered, and if it exceeds 15 parts by weight, the flame retardancy is also lowered due to their aggregation.

It is preferable that the nanoclay maintains a water content of 0.5% to 10%. When the nanoclay having a swelling property with respect to water has a water content of less than 0.5%, aggregation between the particles occurs, making it difficult to disperse. When the water content exceeds 10%, the water content of the synthetic resin mixed in the subsequent process increases, and the physical properties of the finally prepared organic-inorganic composite synthetic resin change.

It is preferable that the nanoclay maintains a true density of 1.5 $g/cm^3$ to 3 $g/cm^3$. When the true density is less than 1.5 $g/cm^3$, the specific surface area becomes high, so that water absorption becomes easy, and when the true density exceeds 3 $g/cm^3$, the load increases, which can cause precipitation of the nanoclay.

It is preferable to use the nanoclay having an average particle size (d50) of 30 μm or less. When the average particle size exceeds 30 μm, the density increases, and there is a risk that nanoclays will precipitate due to load.

The nanoclay may be at least one selected from the group consisting of montmorillonite, bentonite, hectorite, saponite, bidelite, nontronite, mica, vermiculite, carnemite, magadiite, kenyaite, kaolinite, smectite, illite, chlorite, muscovite, pyrophillite, antigorite, sepiolite, imogolite, sobokite, nacrite, anoxite, sericite, redikite and combinations thereof.

Further, the nanoclay may be a hydrophilic nanoclay subjected to sodium ion ($Na^+$), calcium ion ($Ca^{2+}$), acid treatment or substituted with alkylammonium or alkylphosphonium organizing agent ions having a hydroxy group at the terminal, a hydrophobic nanoclay substituted with some alkylammonium or alkylphosphonium organizing agent ions, and a combination of the hydrophilic nanoclay and the hydrophobic nanoclay.

The nanoclay may be used in combination with carbon nanotubes. When the carbon nanotubes are combined with the nanoclay, it exhibits the effect of increasing the dispersibility with the synthetic resin compound of the present invention, and improving the heat insulating performance after molding, coating, or film-forming, or drying onto a specific molding or adhered surface. However, the type and content of the carbon nanotubes are not particularly limited.

In step (2), the nanoclay is swollen in the aqueous or oily solvent in step (1), and the swollen nanoclay, the metal ion phosphinate, and the melamine cyanurate are stirred.

The stirring temperature, stirring time and stirring RPM are not particularly limited, but sufficient stirring is performed so that the metal ion-based phosphinate, the melamine cyanurate, and the nanoclay have sufficient dispersibility.

Figure 1B:
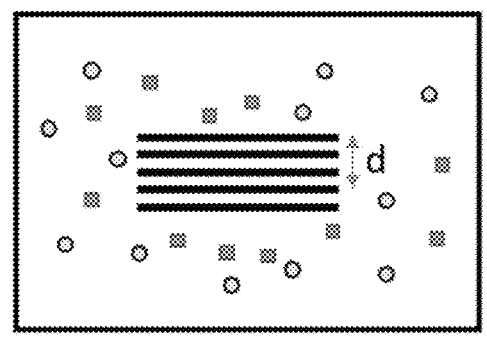
Figure 1D:
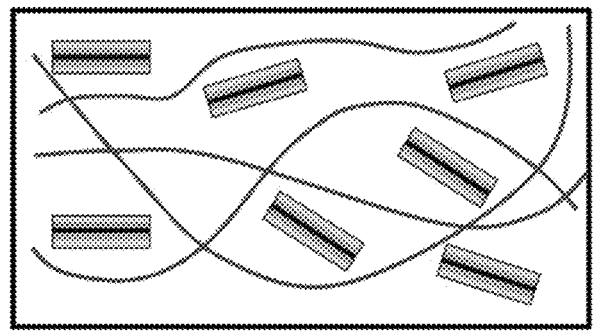
Figure 1C:
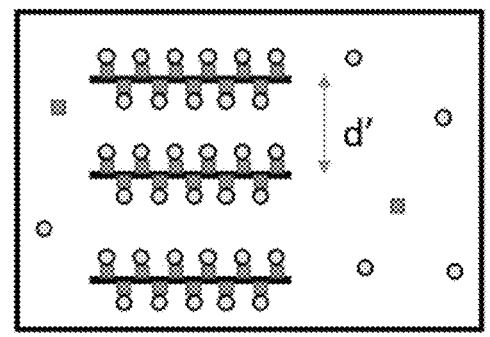

Alternatively, the nanoclay is sufficiently swollen under the aqueous or oily solvent, so that the metal ion-based phosphinate and the melamine cyanurate are stirred under appropriate conditions to facilitate insertion between the layers of the nanoclay in a subsequent process. (FIG. 1B)

The viscosity of the first mixed solution, that has been stirred as a result of step (2), should not exceed 3,000 cps. When the viscosity exceeds 3,000 cps, the energy generated in the ultrasonic treatment process or the high-pressure treatment process of the subsequent step (3) does not reach the raw material, which causes a problem that the efficiency is lowered.

In steps (3) to (7), the first mixed solution, that has been stirred as a result of step (2), is subjected to an ultrasonic treatment process or a high pressure treatment process to prepare a second mixed solution, which is a highly flame-retardant organically modified silicate solution.

When ultrasound or high pressure is applied to the first mixed solution, the nanoclay that has been aggregated by the Van der Waals force is expanded between the layers while the ultrasonic or high-pressure energy is continuously applied.

Subsequently, the metal ion-based phosphinate particles and the melamine cyanurate particles dispersed in the aqueous or oily solvent are intercalated between the expanded nanoclay layers.

At the same time, while the ultrasonic or high-pressure energy is continuously applied to the first mixed solution, the melamine cyanurate chemically bonds with the nanoclay. At the same time, the melamine cyanurate chemically bonds with the metal ion-based phosphinate.

Finally, while the ultrasonic or high-pressure energy is continuously applied to the first mixed solution, the nanoclay is chemically bonded to the melamine cyanurate simultaneously between the nanoclay layers, and the metal ion-based phosphinate chemically bonds with the melamine cyanurate, so that the nanoclay is surrounded by a chemical bond by the bonded metal ionic phosphinate and melamine cyanurate.

Then, the nanoclay is completely exfoliated between the layers, and eventually, even when application the ultrasonic or high pressure is removed, the nanoclay is maintained in a exfoliated state without aggregation. (FIG. 1C) The chemical bonding mechanism in steps (3) to (7) will be described with reference to FIGS. 2 and 3.

Figure 2:
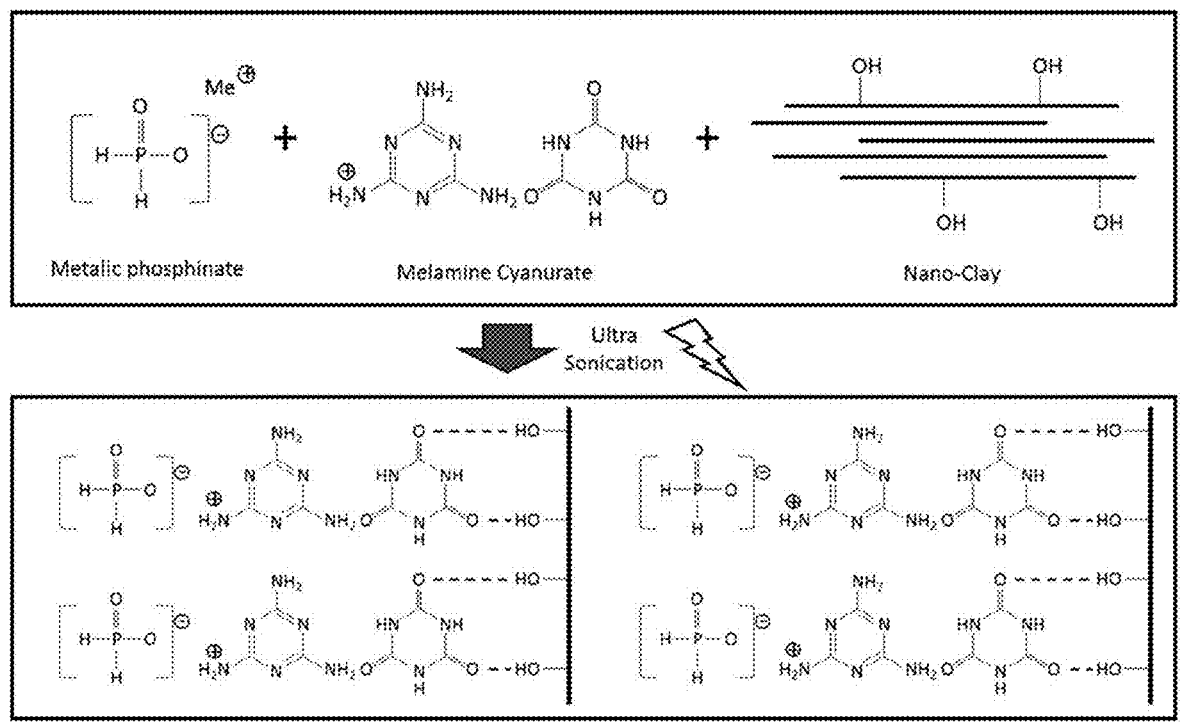
FIG. 2 is a schematic diagram showing the chemical bonding of a metal ion-based phosphinate, melamine cyanurate, and nanoclay by an ultrasonic treatment process or a high pressure treatment process according to the embodiment of the present invention.
Figure 3:
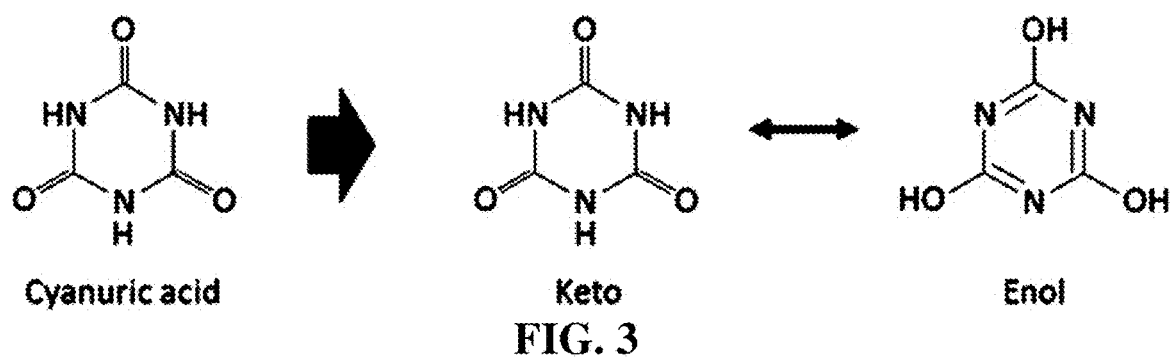
FIG. 3 is a schematic diagram showing the chemical structures of the keto and enol forms of cyanuric acid forming the structure of melamine cyanurate according to the embodiment of the present invention.

FIG. 2 is a schematic diagram showing the chemical bonding of a metal ion-based phosphinate, melamine cyanurate, and nanoclay by an ultrasonic treatment process or a high pressure treatment process according to the embodiment of the present invention. FIG. 3 is a schematic diagram showing the chemical structures of the keto and enol forms of cyanuric acid forming the structure of melamine cyanurate according to the embodiment of the present invention.

Referring to FIGS. 2 and 3, the melamine cyanurate is composed of a melamine molecule and a cyanuric acid molecule.

Since the cyanuric acid molecule has a resonance structure, it coexists in a keto form and an enol form as shown in FIG. 3.

When the cyanuric acid molecule is maintained in a keto form, it has a carbonyl group at the terminal, and the carbonyl group forms a hydrogen bond with a hydroxyl group present on the surface of the nanoclay by the ultrasonic wave or high pressure.

Alternatively, the cyanuric acid molecule has a hydroxyl group at the terminal when maintained in the enol form, and the hydroxyl group performs condensation reaction with the hydroxyl group present on the surface of the nanoclay by the ultrasonic or high-pressure energy.

Melamine of the melamine cyanurate is a molecule containing a nitrogen atom that is strongly charged with a positive (+) charge. The phosphinate group of the metal ion-based phosphinate basically has a negative (−) charge.

Therefore, a nitrogen atom that is strongly charged with a positive (+) charge in the melamine molecule of the melamine cyanurate forms an ion bond with a phosphinate group that is strongly charged with a negative (−) charge in the metal ion-based phosphinate.

Referring back to FIGS. 1A-1D, in the ultrasonic treatment process of step (3), the dispersion intensity of ultrasonic waves is preferably 200 W to 3,000 W based on 20 kHZ. When the dispersion intensity is less than 200 W, the dispersion efficiency decreases, and if it exceeds 3,000 W, there is a problem that physical properties are deteriorated due to damage to the nanoclay.

The volume to which ultrasonic waves can be applied is not limited, but may be 100 ml to 20 L per minute, and may be adjusted according to the ultrasonic dispersion strength.

When ultrasonic waves are applied, the temperature of the solution containing the nanoclay may be raised by vibration and friction. Therefore, it is preferable that the ultrasonic treatment process be performed below the boiling point of the aqueous or oily solvent.

Alternatively, the high pressure treatment process of step (3) is preferably performed by applying a pressure of 1,000 bar to 3,000 bar. A high-pressure disperser used when applying high pressure is a device that puts fluid in a chamber of a certain size and applies high pressure to induce dispersion of the fluid. In the high-pressure treatment process, when the pressure is less than 1,000 bar, the dispersion efficiency decreases, and when it exceeds 3,000 bar, the physical properties are deteriorated due to damage of the nanoclay.

Similarly, the high pressure treatment process is preferably carried out below the boiling point of the aqueous or oily solvent.

In step (8), a synthetic resin compound is added to the second mixed solution prepared as a result of step (7) and stirred.

When the synthetic resin compound is mixed before the ultrasonic treatment process or the high pressure treatment process, the viscosity becomes excessively high, and the efficiency of the ultrasonic treatment process or the high pressure treatment process decreases due to the macromolecular chain of the synthetic resin compound, which is not preferable. The method and conditions for mixing and stirring the synthetic resin compound are not particularly limited.

The mixing weight ratio of the synthetic resin compound to the second mixed solution may be 1:0.5 to 1:3.0.

If the mixing weight ratio is less than 1:0.5 or exceeds 1:3.0, the workability of the produced organic-inorganic composite synthetic resin is significantly deteriorated.

The synthetic resin compound is a material obtained by mixing a synthetic resin with an aqueous or oily solvent, and the solid content of the synthetic resin may be included in an amount of 25 parts by weight to 75 parts.

When the solid content of the synthetic resin is less than 25 parts by weight or exceeds 75 parts by weight, the processability of the organic-inorganic composite synthetic resin to be produced is significantly deteriorated.

The synthetic resin may be at least one or more selected from among a thermoplastic or thermosetting synthetic resin including polyurethane, polyurea, polyethylene terephthalate, polyvinyl chloride, polysilicon and polyethylene, and a foam, rubber or foam rubber using the thermoplastic or thermosetting synthetic resin.

The synthetic resin compound has preferably a viscosity of 20,000 cps to 200,000 cps.

The synthetic resin compound may be dried or added with a solvent or a liquid flame retardant for viscosity control, and the drying conditions for controlling the viscosity or the type of solvent or liquid flame retardant to be added are not restricted.

In order to enhance the compatibility of the synthetic resin compound with the second mixed solution prepared as a result of step (7) in the process of step (8), the organic-inorganic composite synthetic resin of the present invention may contain one type selected from the group consisting of a silane coupling agent or a combination thereof.

The silane coupling agent is selected according to the type and characteristics of the synthetic resin, and thus is not limited.

The organic-inorganic composite synthetic resin of the present invention prepared as a result of step (8) may have a viscosity of 5,000 cps to 20,000 cps.

The organic-inorganic composite synthetic resin of the present invention may be dried for viscosity control or further include a separate solvent or a liquid flame retardant. The drying conditions for controlling the viscosity of the organic-inorganic composite synthetic resin of the present invention or the type of solvent or liquid flame retardant to be added are not restricted.

According to the present invention, an organic-inorganic composite synthetic resin processed product can be produced by including the step of molding, coating, or film-forming the organic-inorganic composite synthetic resin of the present invention on a specific molded product or adhered surface. In detail, methods such as casting, impregnation, application, etc. may be used using equipment such as extrusion, injection, hot melt, coater, roll, applicator, etc. and the preparation may be made using various equipment and methods other than the production equipment and methods listed above.

The method for producing the processed product further includes drying the processed product, and the drying method is not particularly limited, but if the processed product is not sufficiently dried, the physical properties of the prepared organic-inorganic composite synthetic resin may be deteriorated.

The method for producing the organic-inorganic composite synthetic resin of the present invention is not limited, but various additives may be used depending on the application purpose and required physical properties.

The type of the additives include a wetting agent, an antifoaming agent, a leveling agent, a thickener, a diluent, a lubricant, a coupling agent, an organizing agent, a surfactant, an active catalyst, an inert catalyst, an initiator, an inhibitor, a scavenger, a brightener, a matte agent, a pigment, an antioxidant, an ultraviolet absorber, a light stabilizer, a nucleating agent, a flame retardant, an anti-pinhole agent, an antibacterial agent, a slip agent, and the like.

The organic-inorganic composite synthetic resin using the highly flame-retardant organic modified silicate prepared according to the present invention can achieve a V-0 rating by the UL-94V (Vertical Burning Test) method, which is a vertical flame retardancy test for plastic products, among the plastic test methods provided by UL (Underwriters Laboratory).

Specifically, a flame having a length of 20 mm is contacted with a specimen for 10 seconds by the above method, and then the burning time and the burning pattern are recorded.

When the burning is finished after the $1^{st}$ flame contact, the burning time, spark-formation time and the burning pattern of the specimen after flame contact for another 10 seconds are recorded.

The condition of the V-0 rating is that the 1st and $2^{nd}$ individual burning time must be 10 seconds or less, the burning and spark-formation time after the $2^{nd}$ flame contact should be within 30 seconds, and ignition of cotton wool by dripping, and burning up to the clamp shall not occur.

The organic-inorganic composite synthetic resin prepared by the method for producing an organic-inorganic composite synthetic resin using a highly flame-retardant organic modified silicate according to the embodiment of the present invention can achieve a V-0 rating by such UL-94V (Vertical Burning Test) method, and thus can provide excellent flame retardant effect.

The highly flame-retardant organic-modified nanoparticles of the present invention include at least one nano-interlayer exfoliation layer exfoliated from the nanoclay, a metal ion-based phosphinate, and melamine cyanurate.

The nanoclay is swollen by an aqueous solvent or an oil solvent, and separated between layers through an ultrasonic treatment process or a high pressure treatment process, to which the metal ion-based phosphinate and the melamine cyanurate can be inserted to form one or more nano-interlayer exfoliation layers on the nanoclay.

At this time, the hydroxyl group present on the surface of the nano-interlayer exfoliation layer is chemically bonded to the cyanurate group of the melamine cyanurate, and the melamine cyanurate and the nano-interlayer exfoliation layer may be chemically bonded through an ultrasonic treatment process or a high pressure treatment process.

The organic modified nanoparticles may be produced by mixing an aqueous solvent or an oily solvent with the nanoclay, the metal ionic phosphinate, and the melamine cyanurate.

Further, the organically modified nanoparticles may be included in the aqueous solvent or the oily solvent to form a solution containing highly flame retardant organic modified nanoparticles.

The organic-inorganic composite synthetic resin can be prepared by using the organically modified nanoparticles of the present invention, but the highly flame-retardant organically-modified nanoparticles of the present invention and the organic-inorganic composite synthetic resin using the same has been described in detail in the explanation of FIGS. 1 to 3 and thus, duplication description will be omitted.

Further, an organic-inorganic composite synthetic resin processed product can be obtained by processing the organic-inorganic composite synthetic resin containing the organically modified nanoparticles of the present invention by at least one of molding, coating, and film-formation, and such a processed product can achieve the V-0 rating by the UL-94V (Vertical Burning Test) method as described in the preparation method of the organic-inorganic composite synthetic resin, thereby having excellent flame retardancy.

Hereinafter, a mechanism of a method for producing an organic-inorganic composite synthetic resin using a highly flame-retardant organically modified silicate according to the embodiment of the present invention can be confirmed through FIGS. 4 to 6.

Figure 4:
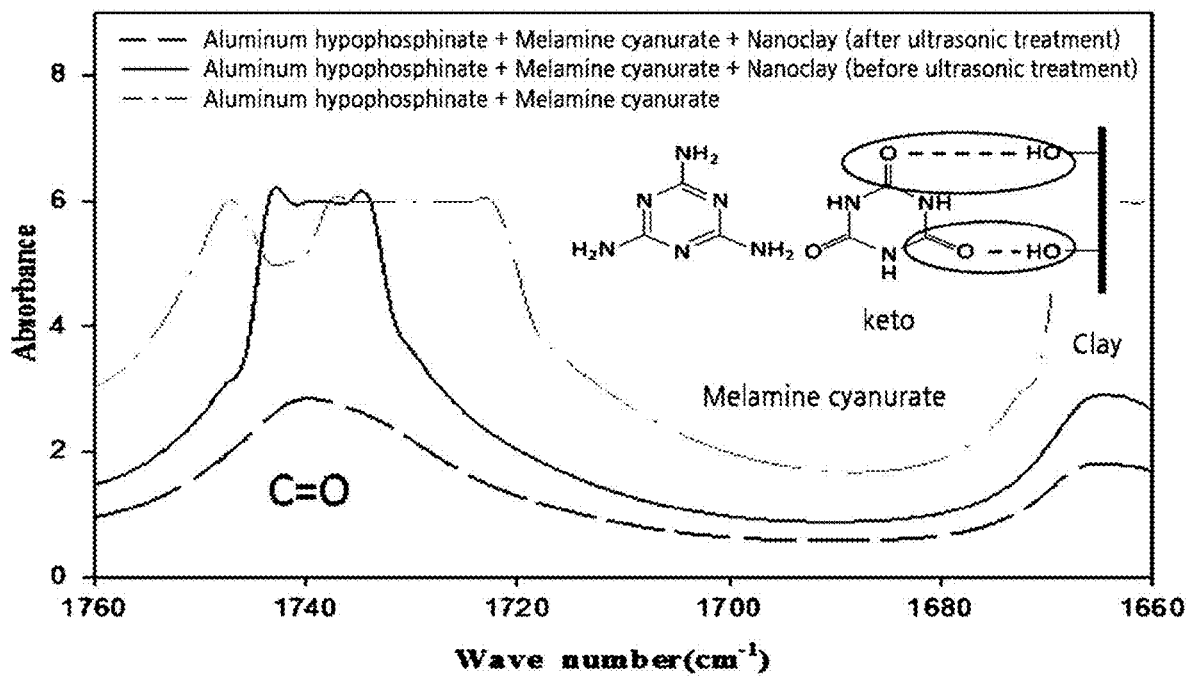
FIG. 4 shows an FT-IR graph (1) based on the chemical bonding of melamine cyanurate and nanoclay according to the embodiment of the present invention.

FIG. 4 shows an FT-IR graph (1) based on the chemical bonding of melamine cyanurate and nanoclay according to the embodiment of the present invention.

Referring to FIG. 4, it can be confirmed that in the state where the metal ion-based phosphinate and the melamine cyanurate are mixed, and in the state where the metal ion phosphinate, the melamine cyanurate, and the nanoclay are mixed, the carbonyl peaks of keto cyanuric acid appear strongly at FT-IR 1,740 $cm^{-1}$.

Two peaks appear because the carbonyl group of the cyanuric acid is shared with melamine or is separated from each other.

However, when energy is applied via ultrasonic waves or high pressure in this state, it can be seen that the carbonyl peak is rapidly reduced, and thus consumed by forming a hydrogen bond with the hydroxyl group of the nanoclay.

Figure 5:
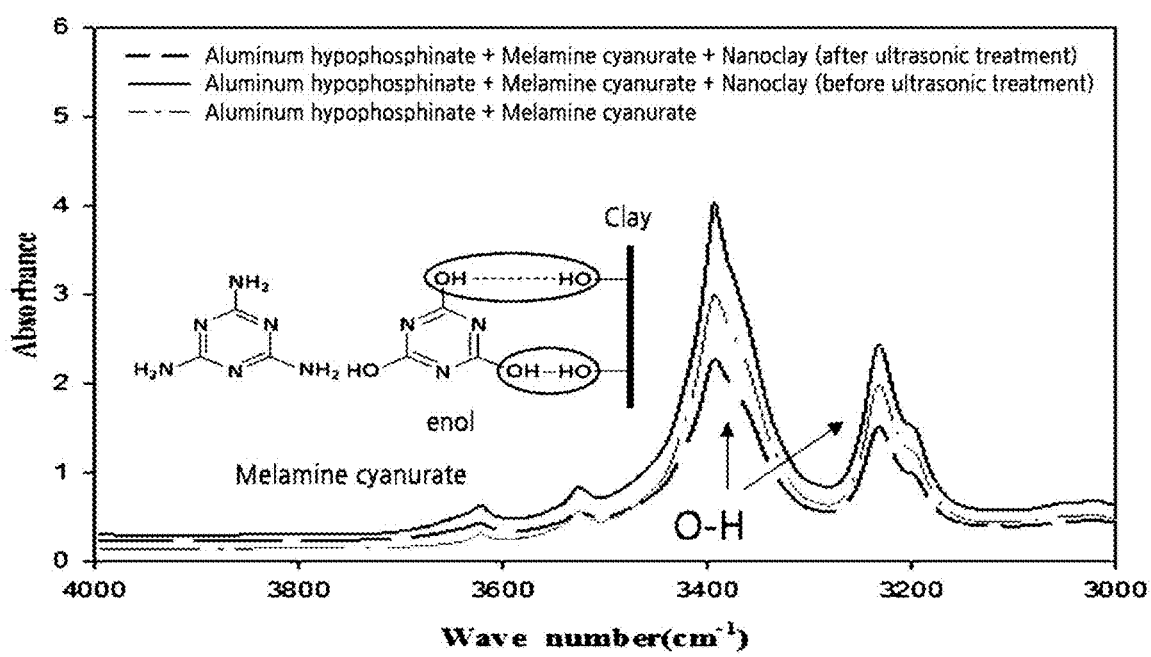
FIG. 5 shows an FT-IR graph (2) based on the chemical bond between melamine cyanurate and nanoclay according to the embodiment of the present invention.

FIG. 5 shows an FT-IR graph (2) based on the chemical bond between melamine cyanurate and nanoclay according to the embodiment of the present invention.

Referring to FIG. 5, it can be confirmed that in the state where the metal ion-based phosphinate and the nanoclay are mixed, or in the state where the metal ionic phosphinate, the melamine cyanurate, and the nanoclay are mixed, hydroxyl peaks appear strongly at FT-IR 3,200 cm$^{-1}$ or 3,400 cm$^{-1}$.

The reason why the peaks when nanoclays are mixed with the two-component raw materials appear more strongly than when the metal ionic phosphinate and the melamine cyanurate are mixed is because the number of hydroxyl groups possessed by the nanoclay itself is large and thus, the content of the hydroxyl group increases.

However, if energy is applied through ultrasonic waves or high pressure in this state, it can be seen that the hydroxyl group peak decreases rapidly, it is consumed by a condensation reaction between the hydroxyl group of the melamine cyanurate enol and the hydroxyl group of the nanoclay.

Figure 6:
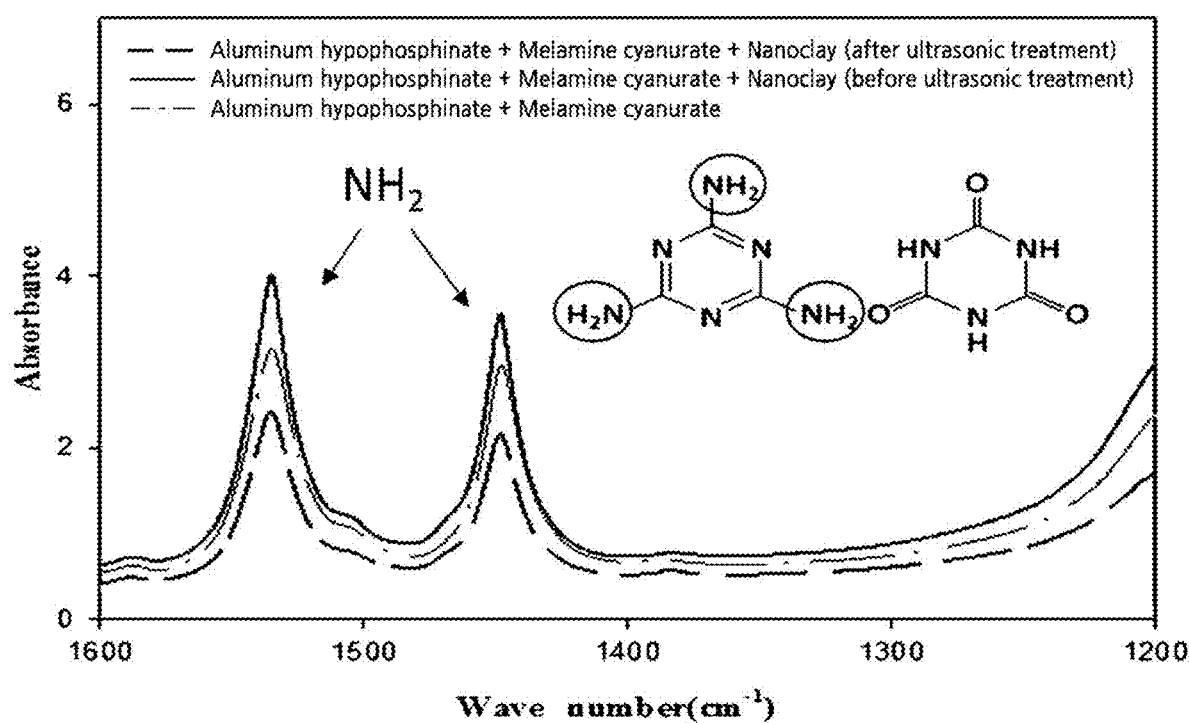
FIG. 6 shows an FT-IR graph based on the chemical bond between a metal ion-based phosphinate and melamine cyanurate according to the embodiment of the present invention.

FIG. 6 shows an FT-IR graph based on the chemical bond between a metal ion-based phosphinate and melamine cyanurate according to the embodiment of the present invention.

Referring to FIG. 6, it can be confirmed that in the state where the metal ion-based phosphinate and the melamine cyanurate are mixed or in the state in which the metal ion-based phosphinate, the melamine cyanurate, and the nanoclay are mixed, amine peaks appear strongly at FT-IR 1,450 cm$^{-1}$ or 1,530 cm$^{-1}$.

The reason why the peaks when the nanoclay is mixed with the two-component raw material appear more strongly than when the metal ion-based phosphinate and the melamine cyanurate are mixed is because the nanoclay contains an organic agent having a nitrogen atom as a positive (+) ion.

Nanoclays distributed or processed in the market are generally subjected to an organizing treatment to increase compatibility with synthetic resins.

Therefore, it can be confirmed that since the number of amine groups based on a positive nitrogen atom is large and thus the content of the amine group increases, the peak appears high.

However, if energy is applied via ultrasonic waves or high pressure in this state, it can be seen that the amine peak rapidly decreases and the metal ion-based phosphinate and the melamine molecule of the melamine cyanurate ionic are bonded to consume the amine group.

Smooth insertion of the metal ion-based phosphinate and the melamine cyanurate between the nanoclay layers and the inter-layer exfoliation of the nanoclay can be confirmed using an X-ray diffraction analyzer.

Figure 7:
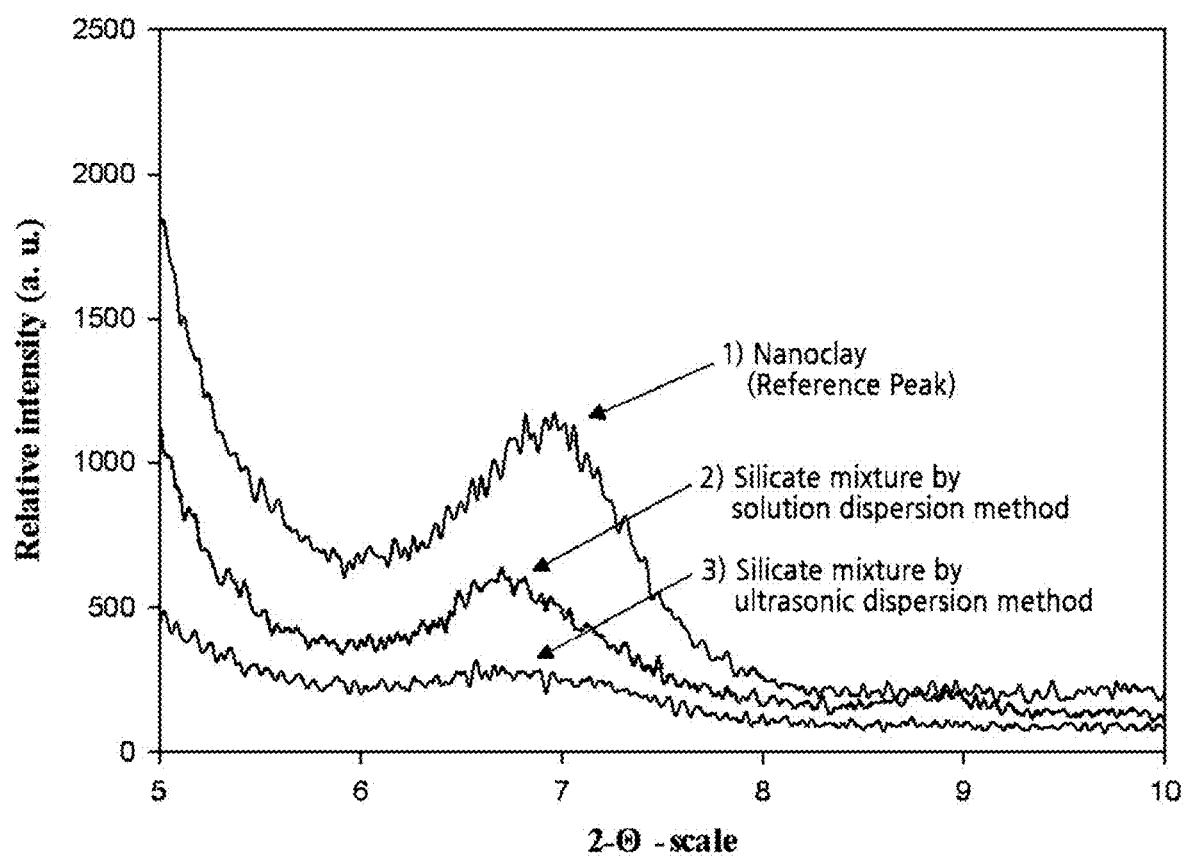
FIG. 7 is a graph showing X-ray diffraction of highly flame-retardant organically modified silicate according to the embodiment of the present invention.

FIG. 7 is a graph showing X-ray diffraction of highly flame-retardant organically modified silicate according to the embodiment of the present invention.

Referring to FIG. 7, the distance between the layers of the nanoclay can be obtained by the Bragg's Law equation, The nanoclay is represented by 1) in FIG. 7, the mixture in which the metal ion phosphinate, the melamine cyanurate, and the nanoclay are mixed/stirred in a solvent and dried is represented by 2), and the mixture in which the mixture solution of 2) is stirred and dried by applying ultrasonic waves is represented by 3).

$$2d \sin \theta = n\lambda$$

Here, d refers to the distance between crystal planes (nanoclay), θ refers to the angle between the incident X-ray and the crystal plane, and λ refers to the wavelength of the X-ray.

In general, the 2θ value of the X-ray diffraction peak represents the distance between the layers of the nanoclay. As the 2θ value increases, the distance between the layers increases, and when complete exfoliation occurs, the peak disappears.

Therefore, it can be confirmed through FIG. 7 that the metal ion-based phosphinate and the melamine cyanurate are inserted through the ultrasonic waves or high-pressure treatment process of step (3), and the separation occurs between the nanoclay layers. (d<d' in FIGS. 1A-1D)

Hereinafter, the present invention will be described in detail through specific examples and comparative example. However, these examples are for illustrative purposes only and should not be construed as limiting the scope of the present invention.

EXAMPLE

Example 1

In order to prepare an organically modified silicate solution, 45 parts by weight of MEK (methyl ethyl ketone) and 15 parts by weight of DMF (N,N-dimethylformamide) used as solvents were placed in a container, and 15 parts by weight of aluminum hypophosphinate, 10 parts by weight of melamine cyanurate, 10 parts by weight of nanoclay, and 5 parts by weight of CDP (cresyl diphenyl phosphate) were added to the mixture of solvents, and the mixture was stirred for 15 minutes under the conditions of 25° C. and 250 RPM.

Then, when the stirring was completed, the solution was applied with 1,500 W based on 20 kHZ at a flow rate of 6 L/min in a continuous ultrasonic process, and discharged through a line.

Then, 100 parts by weight of the polyester polyurethane resin and 10 parts by weight of the pigment were mixed with the silicate liquid subjected to the ultrasonic process, and then the mixture was stirred at 2,000 RPM for 15 minutes.

When the stirring was completed, the mixture was coated with a thickness of 0.5 mm in a release film, then bonded together with a non-woven fabric with a thickness of 1 mm and dried at 110° C. for 24 hours to produce synthetic leather.

Example 2

Synthetic leather was produced by the method of Example 1, but the mixture was subjected to a high pressure process of 1,500 bar instead of ultrasonic waves.

Example 3

Synthetic leather was produced by the method of Example 1, but 25 parts by weight of DMF solvent, 10 parts by weight of aluminum hypophosphinate, and 5 parts by weight of melamine cyanurate were applied.

Example 4

Synthetic leather was produced by the method of Example 3, but the mixture was subjected to a high pressure process of 1,500 bar instead of ultrasonic waves.

Example 5

Synthetic leather was produced by the method of Example 1, but 20 parts by weight of DMF solvent, 13 parts by weight of aluminum hypophosphinate, and 7 parts by weight of melamine cyanurate were applied.

Example 6

Synthetic leather was produced by the method of Example 1, but 19 parts by weight of DMF solvent, and 6 parts by weight of nanoclay were applied.

Example 7

Synthetic leather was produced by the method of Example 1, but 12 parts by weight of DMF solvent, and 13 parts by weight of nanoclay were applied.

Example 8

Synthetic leather was produced by the method of Example 1, but 35 parts by weight of MEK solvent, 20 parts by weight of aluminum hypophosphinate, and 15 parts by weight of melamine cyanurate were applied.

Example 9

Synthetic leather was produced by the method of Example 1, but 35 parts by weight of MEK solvent and 25 parts by weight of aluminum hypophosphinate were applied.

Example 10

Synthetic leather was produced by the method of Example 1, but 35 parts by weight of MEK solvent, 11 parts by weight of DMF solvent, 25 parts by weight of aluminum hypophosphinate, 17 parts by weight of melamine cyanurate and 7 parts by weight of nanoclay were applied.

Comparative Example 1

Synthetic leather was produced by the method of Example 1, but the mixture was dispersed under the solution dispersion condition of 500 rpm instead of ultrasonic waves.

Comparative Example 2

Synthetic leather was produced by the method of Example 1, but the mixture was dispersed under the solution dispersion condition of 1,000 rpm instead of ultrasonic waves.

Comparative Example 3

Synthetic leather was produced by the method of Example 1, but the mixture was dispersed under the solution dispersion condition of 2,000 rpm instead of ultrasonic waves.

Comparative Example 4

Synthetic leather was produced by the method of Example 1, but the mixture was dispersed under the solution dispersion condition of 5,000 rpm instead of ultrasonic waves.

Comparative Example 5

Synthetic leather was produced by the method of Example 1, but the mixture was dispersed under the solution dispersion condition of 10,000 rpm instead of ultrasonic waves.

Comparative Example 6

In order to prepare an organically modified silicate solution, 45 parts by weight of MEK (methyl ethyl ketone) and 15 parts by weight of DMF (N,N-dimethylformamide) used as solvents were placed in a container, and 100 parts by weight of an ester-based polyurethane resin and 10 parts by weight of a pigment were added to the mixture of solvents, and the mixture was stirred for 15 minutes under the conditions of 25° C. and 2,000 RPM.

Then, when the stirring was completed, the solution was applied with 1,500 W based on 20 kHZ at a flow rate of 6 L/min in a continuous ultrasonic process, and discharged through a line.

Then, the mixed solution on which the ultrasonic process was completed was coated with a thickness of 0.5 mm on a release film, and then bonded together with a nonwoven fabric having a thickness of 1 mm, and dried at 110° C. for 24 hours to prepare synthetic leather.

Comparative Example 7

In order to prepare an organically modified silicate solution, 60 parts by weight of MEK (methyl ethyl ketone) and 25 parts by weight of DMF (N,N-dimethylformamide) used as solvents were placed in a container, and 10 parts by weight of nanoclay and 5 parts by weight of CDP (cresyl diphenyl phosphate) were added to the mixture of solvents, and the mixture was stirred for 15 minutes under the conditions of 25° C. and 250 RPM.

Then, when the stirring was completed, the solution was applied with 1,500 W based on 20 kHZ at a flow rate of 6 L/min in a continuous ultrasonic process, and discharged through a line.

Then, 100 parts by weight of an ester-based polyurethane resin and 10 parts by weight of the pigment were mixed with the silicate liquid subjected to the ultrasonic process, and then the mixture was stirred at 2,000 RPM for 15 minutes.

When the stirring was completed, the mixture was coated with a thickness of 0.5 mm on the release film, then bonded together with a non-woven fabric with a thickness of 1 mm and dried at 110° C. for 24 hours to produce synthetic leather.

Comparative Example 8

Synthetic leather was produced by the method of Comparative Example 7, but 45 parts by weight of MEK solvent, 30 parts by weight of DMF, and 20 parts by weight of aluminum hypophosphinate instead of nanoclay were applied.

Comparative Example 9

Synthetic leather was produced by the method of Comparative Example 7, but 45 parts by weight of MEK solvent, 40 parts by weight of DMF, 10 parts by weight of melamine cyanurate instead of nanoclay were applied.

Comparative Example 10

Synthetic leather was produced by the method of Comparative Example 7, but 45 parts by weight of MEK solvent, 20 parts by weight of DMF, and 20 parts by weight of aluminum hypophosphinate instead of nanoclay were applied.

Comparative Example 11

Synthetic leather was produced by the method of Comparative Example 7, but 50 parts by weight of MEK solvent and 10 parts by weight of melamine cyanurate were applied.

Comparative Example 12

Synthetic leather was produced by the method of Comparative Example 7, but 45 parts by weight of MEK solvent, 20 parts by weight of DMF, 0 parts by weight (addition X) of nanoclay, 20 parts by weight of aluminum hypophosphinate, and 10 parts by weight of melamine cyanurate were applied.

Comparative Example 13

Synthetic leather was produced by the method of Comparative Example 11, but 45 parts by weight of MEK solvent, 29.5 parts by weight of DMF, and 0.5 parts by weight of aluminum hypophosphinate were applied.

Comparative Example 14

Synthetic leather was produced by the method of Comparative Example 10, but 19.5 parts by weight of DMF solvent, and 0.5 parts by weight of melamine cyanurate were applied.

Comparative Example 15

Synthetic leather was produced by the method of Example 1, but 35 parts by weight of MEK solvent, 12 parts by weight of DMF, and 18 parts by weight of nanoclay were applied.

Comparative Example 16

Synthetic leather was produced by the method of Example 1, but 30 parts by weight of MEK solvent, 10 parts by weight of DMF, and 35 parts by weight of aluminum hypophosphinate were applied.

Comparative Example 17

Synthetic leather was produced by the method of Example 1, but 30 parts by weight of MEK solvent, 10 parts by weight of DMF and 25 parts by weight of melamine cyanurate were applied.

Comparative Example 18

Synthetic leather was produced by the method of Example 1, but 45 parts by weight of MEK solvent, 24.5 parts by weight of DMF and 0.5 parts by weight of nanoclay were applied.

Comparative Example 19

Synthetic leather was produced by the method of Example 1, but 49 parts by weight of MEK solvent, 35 parts by weight of DMF, 0.5 parts by weight of aluminum hypophosphinate and 0.5 parts by weight of melamine cyanurate were applied.

Comparative Example 20

Synthetic leather was produced by the method of Example 1, but 31 parts by weight of DMF solvent, 0.5 parts by weight of aluminum hypophosphinate, 0.5 parts by weight of melamine cyanurate and 18 parts by weight of nanoclay were applied.

Comparative Example 21

In order to prepare an organically modified silicate solution, 45 parts by weight of MEK (methyl ethyl ketone) and 10 parts by weight of DMF (N,N-dimethylformamide) used as solvents were placed in a container, and 20 parts by weight of aluminum hypophosphinate, 10 parts by weight of melamine cyanurate, 10 parts by weight of nanoclay, 5 parts by weight of CDP (cresyl diphenyl phosphate), 10 parts by weight of pigment and 100 parts by weight of ester-based polyurethane resin were added to the mixture of solvents, and the mixture was stirred for 15 minutes under the conditions of 25° C. and 250 RPM.

Then, when the stirring was completed, the solution was applied with 1,500 W based on 20 kHZ at a flow rate of 6 L/min in a continuous ultrasonic process, and discharged through a line.

Then, the mixed solution subjected to the ultrasonic process was coated with a thickness of 0.5 mm onto the release film, and then bonded together with a non-woven fabric with a thickness of 1 mm and dried at 110° C. for 24 hours to produce synthetic leather.

Comparative Example 22

In order to prepare an organically modified silicate solution, 45 parts by weight of MEK (methyl ethyl ketone) and 35 parts by weight of DMF (N,N-dimethylformamide) used as solvents were placed in a container, and 10 parts by weight of TCPP (tris(2-chloroethyl) phosphate) and 10 parts by weight of nanoclay were added to the mixture of solvents, and the mixture was stirred for 15 minutes under the conditions of 25° C. and 250 RPM.

Then, when the stirring was completed, the solution was applied with 1,500 W based on 20 kHZ at a flow rate of 6 L/min in a continuous ultrasonic process, and discharged through a line.

Then, the silicate liquid subjected to the ultrasonic process was mixed 100 parts by weight of an ester-based polyurethane resin and 10 parts by weight of a pigment, and then stirred at 2,000 RPM for 15 minutes.

When the stirring was completed, the mixture was coated with a thickness of 0.5 mm on the release film, and then bonded together with a non-woven fabric with a thickness of 1 mm and dried at 110° C. for 24 hours to produce synthetic leather.

Comparative Example 23

Synthetic leather was produced by the method of Comparative Example 22, but 10 parts by weight of APP (ammonium polyphosphate) was applied instead of TCPP in the formulation of Comparative Example 22.

Comparative Example 24

Synthetic leather was produced by the method of Comparative Example 22, but 10 parts by weight of MPP (melamine polyphosphate) was applied instead of TCPP in the formulation of Comparative Example 22.

Comparative Example 25

Synthetic leather was produced by the method of Comparative Example 22, but 10 parts by weight of melamine was applied instead of TCPP in the formulation of Comparative Example 22.

Comparative Example 26

Synthetic leather was produced by the method of Comparative Example 23, but 25 parts by weight of DMF solvent and 10 parts by weight of MPP were applied.

Comparative Example 27

Synthetic leather was produced by the method of Comparative Example 23, but 25 parts by weight of DMF solvent and 10 parts by weight of melamine were applied.

Comparative Example 28

Synthetic leather was produced by the method of Comparative Example 26, but 15 parts by weight of DMF solvent and 10 parts by weight of TCPP and 10 parts by weight of melamine were applied.

Comparative Example 29

In order to prepare an organically modified silicate solution, 55 parts by weight of MEK (methyl ethyl ketone) and 35 parts by weight of DMF (N,N-dimethylformamide) used as solvents were placed in a container, and 10 parts by weight of aluminum hydroxide was added to the mixture of solvents, and the mixture was stirred for 15 minutes under the conditions of 25° C. and 250 RPM.

Then, when the stirring was completed, the solution was applied with 1,500 W based on 20 kHZ at a flow rate of 6 L/min in a continuous ultrasonic process, and discharged through a line.

Then, the silicate liquid subjected to the ultrasonic process was mixed 100 parts by weight of an ester-based polyurethane resin and 10 parts by weight of a pigment, and then stirred at 2,000 RPM for 15 minutes.

When the stirring was completed, the mixture was coated with a thickness of 0.5 mm on the release film, and then bonded together with a non-woven fabric with a thickness of 1 mm and dried at 110° C. for 24 hours to produce synthetic leather.

Comparative Example 30

Synthetic leather was produced by the method of Comparative Example 29, but 10 parts by weight of magnesium hydroxide was applied instead of aluminum hydroxide in the formulation of Comparative Example 29.

Comparative Example 31

Synthetic leather was produced by the method of Comparative Example 29, but 45 parts by weight of MEK solvent and 10 parts by weight of nanoclay were applied.

Comparative Example 32

Synthetic leather was produced by the method of Comparative Example 30, but 45 parts by weight of MEK solvent and 10 parts by weight of nanoclay were applied.

Comparative Example 33

Synthetic leather was produced by the method of Comparative Example 31, but 25 parts by weight of EMF solvent and 10 parts by weight of magnesium hydroxide were applied.

TABLE 1

Change in content within the specified content and change of dispersion method

| Category | | | Example 1 | Example 2 | Example 3 | Example 4 | Example 5 |
|---|---|---|---|---|---|---|---|
| Formulation | Organically modified silicate solution | MEK | 45 | 45 | 45 | 45 | 45 |
| | | DMF | 15 | 15 | 25 | 25 | 20 |
| | | Aluminum hypophosphinate | 15 | 15 | 10 | 10 | 13 |
| | | Melamine cyanurate | 10 | 10 | 5 | 5 | 7 |
| | | Nanoclay | 10 | 10 | 10 | 10 | 10 |
| | | CDP | 5 | 5 | 5 | 5 | 5 |
| | Synthetic resin for synthetic leather | Pigment | 10 | 10 | 10 | 10 | 10 |
| | | Ester-based polyurethane resin | 100 | 100 | 100 | 100 | 100 |
| Nanoclay dispersion and chemical bond induction method | | | Ultrasonic | High pressure | Ultrasonic | High pressure | Ultrasonic |

TABLE 2

Change in content within the specified content and change of dispersion method

| Category | | | Example 6 | Example 7 | Example 8 | Example 9 | Example 10 |
|---|---|---|---|---|---|---|---|
| Formulation | Organically modified silicate solution | MEK | 45 | 45 | 35 | 35 | 35 |
| | | DMF | 19 | 12 | 15 | 15 | 11 |
| | | Aluminum hypophosphinate | 15 | 15 | 20 | 25 | 25 |
| | | Melamine cyanurate | 10 | 10 | 10 | 10 | 17 |
| | | Nanoclay | 6 | 13 | 10 | 10 | 7 |
| | | CDP | 5 | 5 | 5 | 5 | 5 |

TABLE 2-continued

Change in content within the specified content and change of dispersion method

| Category | | Example 6 | Example 7 | Example 8 | Example 9 | Example 10 |
|---|---|---|---|---|---|---|
| Synthetic resin for synthetic leather | Pigment | 10 | 10 | 10 | 10 | 10 |
| | Ester-based polyurethane resin | 100 | 100 | 100 | 100 | 100 |
| Nanoclay dispersion and chemical bond induction method | | Ultrasonic | Ultrasonic | Ultrasonic | Ultrasonic | Ultrasonic |

TABLE 3

Change of dispersion method (solution stirring)

| | Category | | Comparative Example 1 | Comparative Example 2 | Comparative Example 3 | Comparative Example 4 | Comparative Example 5 |
|---|---|---|---|---|---|---|---|
| Formulation | Organically modified silicate solution | MEK | 45 | 45 | 45 | 45 | 45 |
| | | DMF | 15 | 15 | 15 | 15 | 15 |
| | | Aluminum hypophosphinate | 15 | 15 | 15 | 15 | 15 |
| | | Melamine cyanurate | 10 | 10 | 10 | 10 | 10 |
| | | Nanoclay | 10 | 10 | 10 | 10 | 10 |
| | | CDP | 5 | 5 | 5 | 5 | 5 |
| | Synthetic resin for synthetic leather | Pigment | 10 | 10 | 10 | 10 | 10 |
| | | Ester-based polyurethane resin | 100 | 100 | 100 | 100 | 100 |
| Nanoclay dispersion and chemical bond induction method | | | Solution (500 rpm) | Solution (1000 rpm) | Solution (2000 rpm) | Solution (5000 rpm) | Solution (10000 rpm) |

TABLE 4

Single use and combination of each flame retardant

| | Category | | Comparative Example 6 | Comparative Example 7 | Comparative Example 8 | Comparative Example 9 | Comparative Example 10 | Comparative Example 11 |
|---|---|---|---|---|---|---|---|---|
| Formulation | Organically modified silicate solution | MEK | 45 | 60 | 45 | 45 | 45 | 50 |
| | | DMF | 15 | 25 | 30 | 40 | 20 | 25 |
| | | Aluminum hypophosphinate | X | X | 20 | X | 20 | X |
| | | Melamine cyanurate | X | X | X | 10 | X | 10 |
| | | Nanoclay | X | 10 | X | X | 10 | 10 |
| | | CDP | X | 5 | 5 | 5 | 5 | 5 |
| | Synthetic resin for synthetic leather | Pigment | 10 | 10 | 10 | 10 | 10 | 10 |
| | | Ester-based polyurethane resin | 100 | 100 | 100 | 100 | 100 | 100 |
| Nanoclay dispersion and chemical bond induction method | | | Ultrasonic | Ultrasonic | Ultrasonic | Ultrasonic | Ultrasonic | Ultrasonic |

TABLE 5

Changes outside the specified content of flame retardant (less than or excessive)

| | Category | | Comparative Example 12 | Comparative Example 13 | Comparative Example 14 | Comparative Example 15 | Comparative Example 16 | Comparative Example 17 |
|---|---|---|---|---|---|---|---|---|
| Formulation | Organically modified silicate solution | MEK | 45 | 45 | 45 | 35 | 30 | 30 |
| | | DMF | 20 | 29.5 | 19.5 | 12 | 10 | 10 |
| | | Aluminum hypophosphinate | 20 | 0.5 | 20 | 20 | 35 | 20 |

TABLE 5-continued

Changes outside the specified content of flame retardant (less than or excessive)

| Category | | Comparative Example 12 | Comparative Example 13 | Comparative Example 14 | Comparative Example 15 | Comparative Example 16 | Comparative Example 17 |
|---|---|---|---|---|---|---|---|
| | Melamine cyanurate | 10 | 10 | 0.5 | 10 | 10 | 25 |
| | Nanoclay | X | 10 | 10 | 18 | 10 | 10 |
| | CDP | 5 | 5 | 5 | 5 | 5 | 5 |
| Synthetic resin for synthetic leather | Pigment | 10 | 10 | 10 | 10 | 10 | 10 |
| | Ester-based polyurethane resin | 100 | 100 | 100 | 100 | 100 | 100 |
| Nanoclay dispersion and chemical bond induction method | | Ultrasonic | Ultrasonic | Ultrasonic | Ultrasonic | Ultrasonic | Ultrasonic |

TABLE 6

Changes outside the specified content of flame retardant (less than or excessive)

| Category | | | Comparative Example 18 | Comparative Example 19 | Comparative Example 20 | Comparative Example 21 |
|---|---|---|---|---|---|---|
| Formulation | Organically modified silicate solution | MEK | 45 | 49 | 45 | 45 |
| | | DMF | 24.5 | 35 | 31 | 10 |
| | | Aluminum hypophosphinate | 15 | 0.5 | 0.5 | 20 |
| | | Melamine cyanurate | 10 | 0.5 | 0.5 | 10 |
| | | Nanoclay | 0.5 | 10 | 18 | 10 |
| | | CDP | 5 | 5 | 5 | 5 |
| | Synthetic resin for synthetic leather | Pigment | 10 | 10 | 10 | 10 |
| | | Ester-based polyurethane resin | 100 | 100 | 100 | 100 |
| Nanoclay dispersion and chemical bond induction method | | | Ultrasonic | Ultrasonic | Ultrasonic | Ultrasonic |

TABLE 7

Use of other flame retardant

| Category | | | Comparative Example 22 | Comparative Example 23 | Comparative Example 24 | Comparative Example 25 | Comparative Example 26 | Comparative Example 27 | Comparative Example 28 |
|---|---|---|---|---|---|---|---|---|---|
| Formulation | Organically modified silicate solution | MEK | 45 | 45 | 45 | 45 | 45 | 45 | 45 |
| | | DMF | 35 | 35 | 35 | 35 | 25 | 25 | 15 |
| | | TCPP | 10 | X | X | X | X | X | 10 |
| | | APP | X | 10 | X | X | 10 | 10 | 10 |
| | | MPP | X | X | 10 | X | 10 | X | 10 |
| | | Melamine | X | X | X | 10 | X | 10 | 10 |
| | | Nanoclay | 10 | 10 | 10 | 10 | 10 | 10 | 10 |
| | Synthetic resin for synthetic leather | Pigment | 10 | 10 | 10 | 10 | 10 | 10 | 10 |
| | | Ester-based polyurethane resin | 100 | 100 | 100 | 100 | 100 | 100 | 100 |
| Nanoclay dispersion and chemical bond induction method | | | Ultrasonic | Ultrasonic | Ultrasonic | Ultrasonic | Ultrasonic | Ultrasonic | Ultrasonic |

TABLE 8

Use of other flame retardant

| Category | | | Comparative Example 29 | Comparative Example 30 | Comparative Example 31 | Comparative Example 32 | Comparative Example 33 |
|---|---|---|---|---|---|---|---|
| Formulation | Organically modified silicate solution | MEK | 55 | 55 | 45 | 45 | 45 |
| | | DMF | 35 | 35 | 35 | 35 | 25 |
| | | Aluminum hydroxide | 10 | X | 10 | X | 10 |
| | | Magnesium hydroxide | X | 10 | X | 10 | 10 |
| | | Nanoclay | X | X | 10 | 10 | 10 |

TABLE 8-continued

| | | Use of other flame retardant | | | | |
|---|---|---|---|---|---|---|
| Category | | Comparative Example 29 | Comparative Example 30 | Comparative Example 31 | Comparative Example 32 | Comparative Example 33 |
| Synthetic resin for synthetic leather | Pigment | 10 | 10 | 10 | 10 | 10 |
| | Ester-based polyurethane resin | 100 | 100 | 100 | 100 | 100 |
| Nanoclay dispersion and chemical bond induction method | | Ultrasonic | Ultrasonic | Ultrasonic | Ultrasonic | Ultrasonic |

Test 1.

The burning duration (s) in the burning test of the synthetic leathers of the Comparative Examples, which are compared with the Examples prepared according to the present invention, was measured as the burning time when flame was applied to the specimen for 10 seconds and then removed according to the UL-94V vertical test.

Test 2.

The length (mm) burned during the burning test of the synthetic leather of the Comparative Examples, which are compared with the Examples prepared according to the present invention, was measured as follows. In addition, the results can be confirmed in Tables 9 to 10.

Burned Length During Burning Test (mm)=Specimen Length Before Burning (mm)-Specimen Length after Burning (mm)

Figure 8:
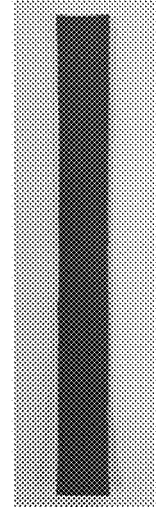
FIGS. 8 to 9 are photographs of the burning patterns of the synthetic leathers of Examples 1 to 10 during the burning test according to the UL-94V test.
Figure 9:
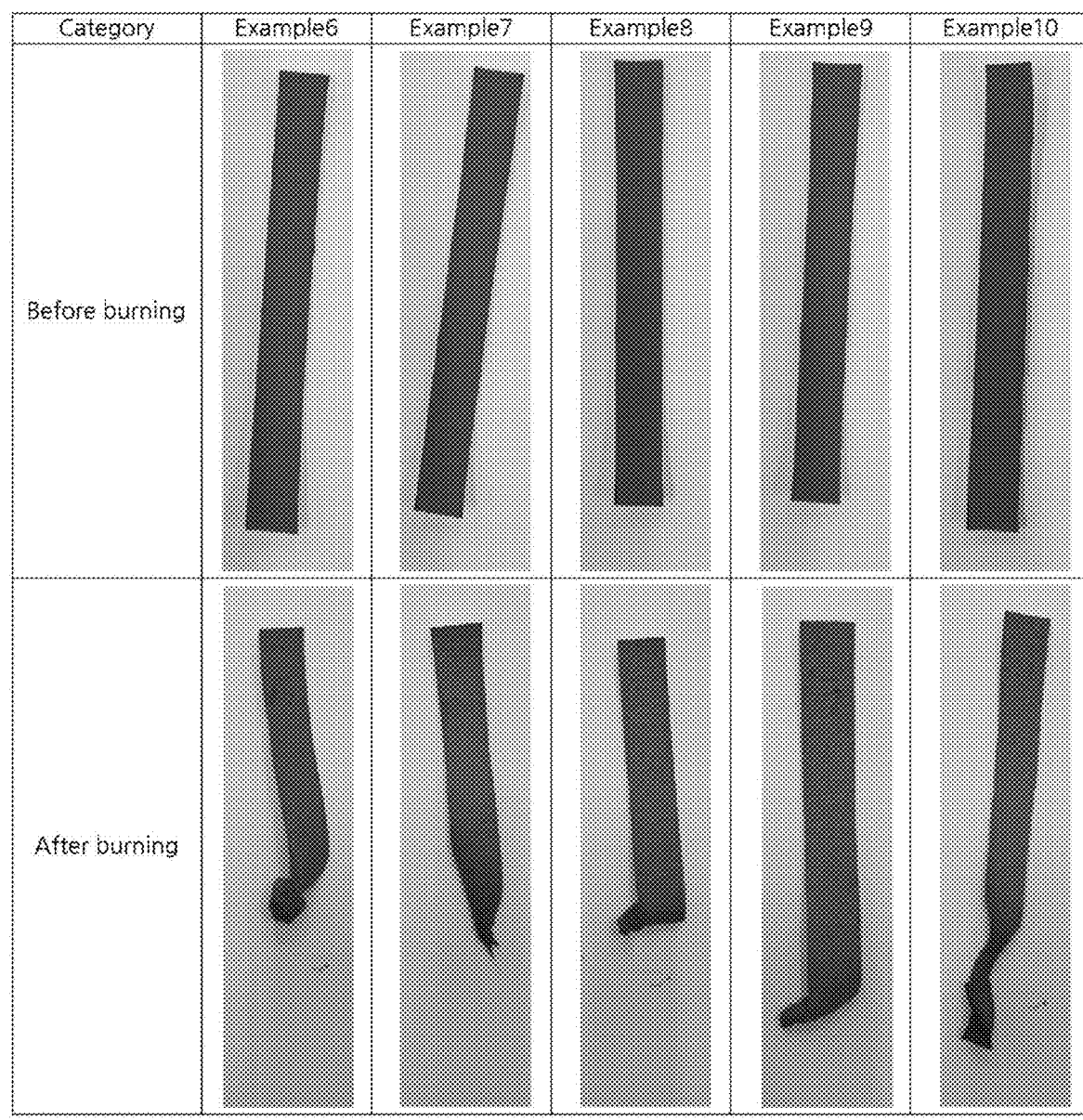
Figure 11:
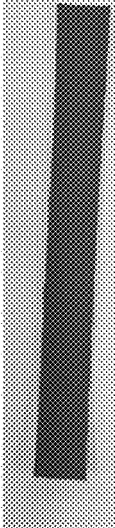
Figure 12:
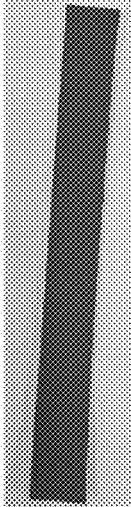
Figure 13:
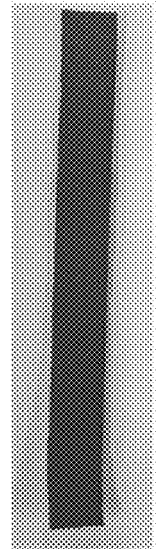
Figure 14:
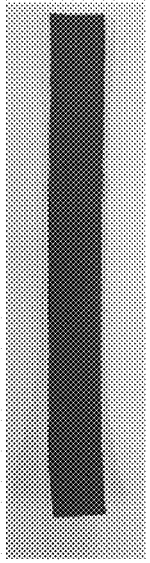
Figure 16:
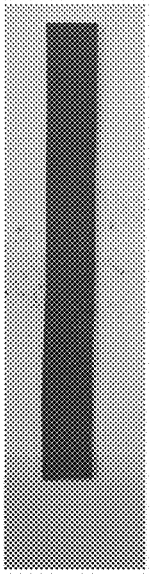

FIGS. 8 to 9 are photographs of the burning patterns of the synthetic leathers of Examples 1 to 10 during the burning test according to the UL-94V test, and FIGS. 10 to 16 are photographs of the burning patterns of the synthetic leathers of Comparative Examples 1 to 33 during the burning test according to the UL-94V test.

TABLE 9

| | Burning test results | | | | |
|---|---|---|---|---|---|
| Category | Example 1 | Example 2 | Example 3 | Example 4 | Example 5 |
| 1$^{st}$ burning duration (s) | 0 | 1 | 3 | 2 | 2 |
| 2$^{nd}$ burning duration (s) | 1 | 2 | 1 | 2 | 1 |
| Final burning length (mm) | 10 | 27 | 25 | 18 | 17 |

| Category | Example 6 | Example 7 | Example 8 | Example 9 | Example 10 |
|---|---|---|---|---|---|
| 1$^{st}$ burning duration (s) | 4 | 3 | 3 | 1 | 2 |
| 2$^{nd}$ burning duration (s) | 2 | 2 | 1 | 1 | 0 |
| Final burning length (mm) | 29 | 24 | 18 | 14 | 15 |

| Category | Comparative Example 1 | Comparative Example 2 | Comparative Example 3 | Comparative Example 4 | Comparative Example 5 |
|---|---|---|---|---|---|
| 1$^{st}$ burning duration (s) | 8 | 13 | 9 | 11 | 9 |
| 2$^{nd}$ burning duration (s) | 10 | 11 | 12 | 13 | 12 |
| Final burning length (mm) | 78 | 79 | 64 | 71 | 69 |

| Category | Comparative Example 6 | Comparative Example 7 | Comparative Example 8 | Comparative Example 9 | Comparative Example 10 |
|---|---|---|---|---|---|
| 1$^{st}$ burning duration (s) | 12 (Dropping occurred) | 13 (Dropping occurred) | 4 (Dropping occurred) | 26 (Dropping occurred) | 8 |
| 2$^{nd}$ burning duration (s) | — | — | — | — | — |
| Final burning length (mm) | 87 | 108 | 89 | 90 | 85 |

TABLE 9-continued

| | Burning test results | | | | |
|---|---|---|---|---|---|
| Category | Comparative Example 11 | Comparative Example 12 | Comparative Example 13 | Comparative Example 14 | Comparative Example 15 |
| $1^{st}$ burning duration (s) | 12 (Dropping occurred) | 8 (Dropping occurred) | 8 (Dropping occurred) | 7 | 11 (Dropping occurred) |
| $2^{nd}$ burning duration (s) | — | 6 | 9 | 6 | 8 |
| Final burning length (mm) | 92 | 87 | 78 | 68 | 73 |

TABLE 10

| | Burning test results | | | | |
|---|---|---|---|---|---|
| Category | Comparative Example 16 | Comparative Example 17 | Comparative Example 18 | Comparative Example 19 | Comparative Example 20 |
| $1^{st}$ burning duration (s) | 13 (Dropping occurred) | 15 (Dropping occurred) | 7 (Dropping occurred) | 13 (Dropping occurred) | 15 (Dropping occurred) |
| $2^{nd}$ burning duration (s) | 7 | — | 9 | — | — |
| Final burning length (mm) | 98 | 101 | 69 | 88 | 92 |
| Category | Comparative Example 21 | Comparative Example 22 | Comparative Example 23 | Comparative Example 24 | Comparative Example 25 |
| $1^{st}$ burning duration (s) | 14 (Dropping occurred) | 16 (Dropping occurred) | 12 | 7 (Dropping occurred) | 6 |
| $2^{nd}$ burning duration (s) | — | — | 7 | 9 | 7 |
| Final burning length (mm) | 86 | 94 | 78 | 83 | 67 |
| Category | Comparative Example 26 | Comparative Example 27 | Comparative Example 28 | Comparative Example 29 | Comparative Example 30 |
| $1^{st}$ burning duration (s) | 28 (Dropping occurred) | 26 (Dropping occurred) | 20 (Dropping occurred) | 22 (Dropping occurred) | 17 (Dropping occurred) |
| $2^{nd}$ burning duration (s) | — | — | — | — | 8 |
| Final burning length (mm) | 82 | 88 | 86 | 84 | 77 |
| Category | Comparative Example 31 | Comparative Example 32 | Comparative Example 33 | | |
| $1^{st}$ burning duration (s) | 9 (Dropping occurred) | 10 | 9 (Dropping occurred) | | |
| $2^{nd}$ burning duration (s) | 11 | 11 | 14 | | |
| Final burning length (mm) | 77 | 76 | 79 | | |

(When burning from the $1^{st}$ burning to the clamp occurs, the duration of the $2^{nd}$ burning is marked with "-")

In the case of Examples of the present invention, nanoclay, aluminum hypophosphinate, melamine cyanurate are stirred in a mixed solvent phase of MEK and DMF, and subjected to an ultrasonic or high pressure treatment process.

By applying ultrasonic or high pressure energy, hydrogen bonding and condensation reaction between nanoclay and melamine cyanurate, a chemical bond such as an ionic bond between aluminum hypophosphinate and melamine cyanurate are performed, thereby surrounding the surface of the nanoclay. At the same time, the insertion, exfoliation, and dispersion of nanoclays within the polyurethane resin are effectively performed by vibration and friction of ultrasonic waves, thereby showing a remarkable improvement in flame retardant performance.

This represents chemical bonding and complete dispersion through the nanoclay. Further, as evidence, it can be seen that the present invention is very excellent when comparing the first and second burning duration and the final burning length with the Comparative Examples. When the nanoclay, melamine cyanurate, and aluminum hypophosphinate molecules bonded to each other are burned, synergistic effects such as flammable gas blocking, char formation, char formation promotion, and gaseous flame retardant effect are generated, eventually leading to high flame retardancy. On the other hand, when all of the components are not included or more than one is missing, and when the components are excessive or insufficient, the chemical bonds and synergies described above cannot be created. Therefore, it can be seen that when the burning test is performed, the flame retardant performance is consequently deteriorated due to an increase of the burning duration and length, ignition of cotton wool due to melt dropping, and ignition up to the clamp.

As described above, although the present invention has been described by a limited embodiments and figures, the present invention is not limited to the above embodiments, and various modifications and variations can be made from these descriptions by those of ordinary skill in the field to which the present invention belongs. Therefore, the scope of the present invention is limited to the described embodiments and should not be defined, but should be defined not only by the claims described later but also by those equivalent to the claims.

What is claimed is:

1. A flame-retardant organically modified nanoparticle comprising:
    one or more nano-interlayer exfoliation layers peeled from nanoclay, metal ion-based phosphinate, and melamine cyanurate,
    wherein a hydroxyl group on the surface of the nano-interlayer exfoliation layer is chemically bonded to a cyanurate group of the melamine cyanurate, and
    a melamine group of the melamine cyanurate is chemically bonded to a phosphinate group of the metal ion-based phosphinate.

2. The flame-retardant organically modified nanoparticle according to claim 1,
    wherein the nanoclay includes at least one selected from the group consisting of montmorillonite, bentonite, hectorite, saponite, bidelite, nontronite, mica, vermiculite, carnemite, magadiite, kenyaite, kaolinite, smectite, illite, chlorite, muscovite, pyrophillite, antigorite, sepiolite, imogolite, sobokite, nacrite, anoxite, sericite, redikite and combinations thereof.

3. The flame-retardant organically modified nanoparticle according to claim 1,
    wherein the nanoclay is in a combination with carbon nanotubes.

4. The flame-retardant organically modified nanoparticle according to claim 1,
    wherein the metal ion-based phosphinate includes, as a metal ion charged with positive (+) charge, at least one selected from the group consisting of aluminum ion ($Al^{3+}$), zinc ion ($Zn^{2+}$), calcium ion ($Ca^{2+}$), magnesium ion ($Mg^{2+}$), copper ion ($Cu^{2+}$), and iron ion ($Fe^{2+}$, $Fe^{3+}$), and
    includes, as a metal ion charged with negative (−) charge, at least one selected from the group consisting of hypophosphinate, monoalkylphosphinate, monoallyl phosphinate, dialkyl phosphinate, diallylphosphinate and alkylallylphosphinate.

5. The flame-retardant organically modified nanoparticle according to claim 1,
    wherein a cyanurate group of the melamine cyanurate coexists in a keto form and an enol form.

6. The flame-retardant organically modified nanoparticle according to claim 1,
    wherein the hydroxyl group on the surface of the nano-interlayer exfoliation layer forms a hydrogen bond with a keto-type carbonyl group of the cyanurate group of the melamine cyanurate, or
    the hydroxyl group on the surface of the nano-interlayer exfoliation layer forms a condensation bond with an enol-type hydroxyl group of the cyanurate group of the melamine cyanurate.

7. The flame-retardant organically modified nanoparticle according to claim 1,
    wherein a nitrogen atom charged with a positive (+) charge contained in the melamine group of the melamine cyanurate forms an ionic bond with a phosphinate group charged with negative (−) charge contained in the metal ion-based phosphinate.

8. A flame-retardant organically modified nanoparticle-containing solution comprising:
    the flame-retardant organic modified nanoparticle of claim 1, and
    an aqueous solvent or an oily solvent.

9. An organic-inorganic composite synthetic resin comprising the flame-retardant organically modified nanoparticle of claim 1, and a synthetic resin.

10. The organic-inorganic composite synthetic resin according to claim 9,
    wherein the synthetic resin includes at least one thermoplastic or thermosetting synthetic resin selected from the group consisting of polyurethane, polyurea, polyethylene terephthalate, polyvinyl chloride, polysilicon and polyethylene.

11. The organic-inorganic composite synthetic resin according to claim 9,
    wherein the synthetic resin has a viscosity of 20,000 to 200,000 cps.

12. An organic-inorganic composite synthetic resin processed product obtained by the organic-inorganic composite synthetic resin of claim 9 by at least one process of molding, coating, and film formation.

13. The organic-inorganic composite synthetic resin processed product according to claim 12,
    wherein the processed product achieves a V-0 rating by the UL-94V (Vertical Burning Test) method.

* * * * *